United States Patent
Larson et al.

(10) Patent No.: US 9,477,059 B2
(45) Date of Patent: Oct. 25, 2016

(54) APPLICATION OF A CONTINUOUS SUBSTRATE WITH SEGMENTED ADHESIVE

(71) Applicant: 3M INNOVATIVE PROPERTIES COMPANY, St. Paul, MN (US)

(72) Inventors: Donald K. Larson, Cedar Park, TX (US); Zachary M. Thompson, Austin, TX (US); Curtis E. Maynes, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 173 days.

(21) Appl. No.: 14/376,063

(22) PCT Filed: Feb. 5, 2013

(86) PCT No.: PCT/US2013/024689
§ 371 (c)(1),
(2) Date: Jul. 31, 2014

(87) PCT Pub. No.: WO2013/119515
PCT Pub. Date: Aug. 15, 2013

(65) Prior Publication Data
US 2015/0020956 A1 Jan. 22, 2015

Related U.S. Application Data

(60) Provisional application No. 61/596,412, filed on Feb. 8, 2012.

(51) Int. Cl.
*B29C 53/56* (2006.01)
*G02B 6/44* (2006.01)
*H02G 3/00* (2006.01)

(Continued)

(52) U.S. Cl.
CPC ............ *G02B 6/4466* (2013.01); *G02B 6/4458* (2013.01); *H01B 11/1895* (2013.01); *H02G 3/266* (2013.01); *H02G 3/305* (2013.01); *Y10T 428/24752* (2015.01)

(58) Field of Classification Search
CPC .................. H02G 3/266; H02G 3/305; Y10T 428/24752; G02B 6/4466; G02B 6/4458; H01B 11/1895
See application file for complete search history.

(56) References Cited

U.S. PATENT DOCUMENTS 5,344,681 A 9/1994 Calhoun
7,369,738 B2 5/2008 Larson (Continued)

FOREIGN PATENT DOCUMENTS

| JP | 2004-320956 | 11/2004 |
|----|-------------|---------|
| JP | 2006-145979 | 6/2006 |
| JP | 2006-235029 | 9/2006 |

OTHER PUBLICATIONS

3M One Pass Mini Fiber Pathway, 2011, 5 pages.

(Continued)

*Primary Examiner* — Jacob T Minskey
*Assistant Examiner* — Vishal I Patel
(74) *Attorney, Agent, or Firm* — Janet A. Kling

(57) ABSTRACT

A system for adhering a length of continuous substrate to a mounting surface is disclosed. The continuous substrate can be attached to a mounting surface by a regular array of spaced apart adhesive segments disposed longitudinally along the continuous substrate and between the mounting surface and the continuous substrate.

9 Claims, 5 Drawing Sheets

(51) Int. Cl.
*H01B 11/18* (2006.01)
*H02G 3/30* (2006.01)

(56) References Cited

U.S. PATENT DOCUMENTS

| | | |
|---|---|---|
| 7,396,061 B2 | 7/2008 | Schwertfeger |
| 2002/0146952 A1 | 10/2002 | Kulper |
| 2005/0000632 A1* | 1/2005 | Von Samon-Himmelstjerna .... B65H 37/007 156/230 |
| 2005/0178507 A1 | 8/2005 | Hajny |
| 2009/0324188 A1* | 12/2009 | Berglund ............. G02B 6/4441 385/135 |
| 2010/0310217 A1 | 12/2010 | Abernathy |
| 2011/0030190 A1 | 2/2011 | Larson |
| 2012/0020635 A1 | 1/2012 | Hendrickson |
| 2012/0066987 A1 | 3/2012 | Malofsky |

OTHER PUBLICATIONS

International Search Report for PCT International Application No. PCT/US2013/024689 mailed on May 15, 2013, 3 pages.

* cited by examiner

APPLICATION OF A CONTINUOUS SUBSTRATE WITH SEGMENTED ADHESIVE

CROSS REFERENCE TO RELATED APPLICATIONS

This application is a national stage filing under 35 U.S.C. 371 of PCT/US2013/024689, filed Feb. 5, 2013, which claims priority to U.S. Provisional Application No. 61/596,412, filed Feb. 8, 2012, the disclosure of which is incorporated by reference in its/their entirety herein.

BACKGROUND OF THE INVENTION

1. Field of the Invention

The present invention is directed to a system for adhering a continuous substrate to a mounting surface for telecommunication cabling applications that includes a segmented pressure sensitive adhesive layer.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced or otherwise connected to the riser cable in the FDT only as service is requested from a tenant in a living unit. These service installations require multiple re-entries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser cables with a single extended drop cable. This approach creates several challenges, including the necessity of first installing a pathway to manage, protect and hide each of the multiple drop cables. This pathway often includes very large (e.g., 2 inch to 4 inch to 6 inch) pre-fabricated crown molding made of wood, composite, or plastic. Many of these pathways, over time, become congested and disorganized, increasing the risk of service disruption due to fiber bends and excessive re-entry.

In addition, further physical and aesthetic challenges exist in providing the final drop to and from each individual living unit. Also, because of their size, many conventional indoor optical network terminals (ONTs) are often placed in the closets of living units out of normal view. This type of arrangement requires that a service provider run new cabling (such as coaxial cables, category 5 cables, and others) from the closet to the existing wiring in the living unit to activate the ONT to provide service. As newer ONTs have become smaller in physical size, they can be placed outside of closets and in main living areas requiring the drops to be run further into the living space of the living unit.

A conventional system for providing a final drop that is installed in a room, such as living unit of an exemplary MDU, single family home, or similar residence, is described in U.S. Patent Application No. 2011-0030190 and is shown in FIG. 1. System 100 comprises one or more point-of-entry units 180 which are mounted over or onto at least a portion of the duct 110 that houses at least one terminated drop fiber. The point-of-entry is located at an access location point within the living unit (i.e. on a living unit wall 103) to provide access to the horizontal cabling provided within the MDU.

The terminated drop fiber(s) can be carried from the point-of-entry unit 180 to an anchor point, such as wall receptacle 190, via low profile duct 110. The wall receptacle 190 receives the drop fiber(s) and provides a connection to an optical network terminal (ONT) 195.

A conventional low profile duct is 3M™ One Pass Mini Fiber Pathway, available from 3M Company (St. Paul, Minn.) and is shown in FIG. 2. The low profile duct 110 includes a conduit portion 112 having a bore 113 to accommodate one or more communication lines 105 and flat flange structures 115 extending laterally from the conduit portion to provide support for the duct 110 as it is adhered to a wall or other generally flat surface via an adhesive layer 118 disposed on the bottom surface 116 of the low profile duct's main body and/or flanges 115. Low profile duct 110 is made of polyvinyl chloride and has a lateral dimension from about 5 mm to about 30 mm, and a height of less than about 2 mm to about 10 mm.

A less bulky, less obtrusive, and more aesthetic system for routing fiber within a living unit is desired so that the impact to the aesthetics of the living unit is minimized.

SUMMARY

According to an exemplary aspect of the present invention, a system for adhering a length of a continuous substrate to a mounting surface is described. The continuous substrate can be attached to a mounting surface by a regular array of spaced apart adhesive segments disposed longitudinally along the continuous substrate and between the mounting surface and the continuous substrate.

In another exemplary aspect, a method of adhering a length of a continuous substrate to a mounting surface is disclosed. The continuous substrate is brought into contact with a transfer tape having an array of adhesive segments disposed on a first major surface of a differential release liner. A portion of the adhesive segments are transferred to the continuous substrate when the liner is pulled away from the continuous substrate. The continuous substrate is then applied to the mounting surface using a moderate pressing force such that the adhesive segments are disposed between the continuous substrate and the mounting surface. The moderate pressing force helps ensure good adhesion of the continuous substrate to the mounting surface.

In an alternative embodiment, a storage system for a continuous substrate is disclosed. The storage system includes a reel and a continuous substrate attached to a liner by an array of adhesive segments disposed along the length of the continuous substrate. The continuous substrate disposed on the liner is wrapped around the reel. In one exemplary aspect, the adhesive segments are disposed between the liner and the continuous substrate, while in an alternative aspect, the continuous substrate is disposed between the liner and a portion of the adhesive segments.

In another embodiment, an alternative method of adhering a length of a continuous substrate to a mounting surface is disclosed. A length of a continuous substrate is provided wrapped around a reel. The continuous substrate includes an array of adhesive segments disposed along the length of the continuous substrate. The continuous substrate is applied to the mounting surface; and a moderate pressing force is applied to the continuous substrate to ensure good adhesion of the continuous substrate to the mounting surface.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
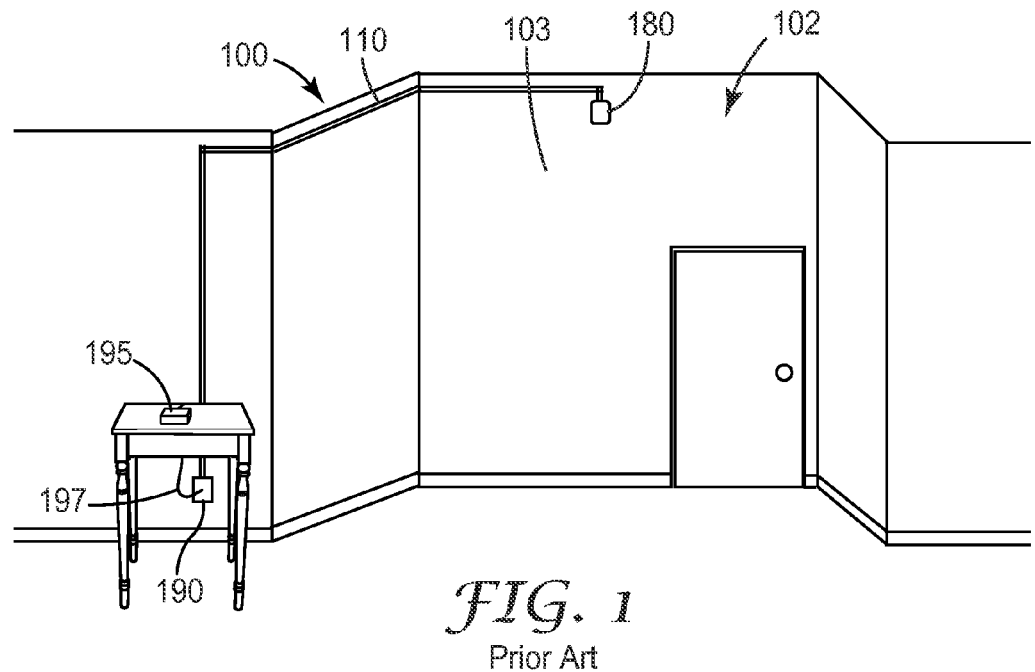
FIG. 1 is a schematic view of a conventional final drop system.
Figure 2:
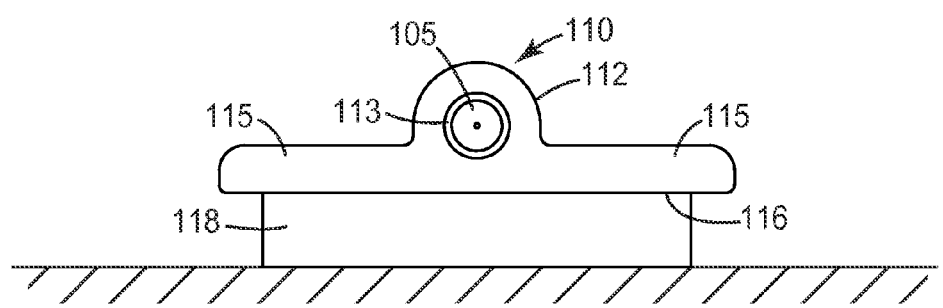
FIG. 2 is a cross-sectional view of a conventional low profile duct used in the final drop system of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

The present invention is directed to an attachment system to adhere a continuous flexible substrate to a mounting surface. The continuous substrate can be a decorative decal, edging, electrical wire or a communication line. The communications lines preferably comprise a drop fiber, an optical fiber cable having one or two optical fibers, although the continuous substrate can also comprise an electrical wire, coaxial/micro-coaxial cable, High-Definition Multimedia Interface (HDMI) cable, Universal Serial Bus (USB) cable, a Cat 5e/6 cable, an Ethernet cable, an active optical cable or other cable used for electrical, data, video, and/or telephone signal transmission. In one aspect, a communications line can comprise a discrete (loose) drop fiber, such as 900 μm buffered optical fiber, 500 μm buffered optical fiber, 250 μm optical fiber, or other standard size optical communications fiber. The optical fiber can be single mode or multi-mode. Example multi-mode fibers can have a 50 μm core size, a 62.5 μm core size, an 80 μm core size, or a different standard core size. In another alternative aspect, the drop fiber can comprise a conventional plastic optical fiber. In yet another aspect, the optical fiber cable can be an FRP drop cable, a 3.0 mm jacketed drop cable, or other optical fiber drop cable. The final drop fiber(s) can be field terminated with an optical fiber connector, such as described in U.S. Pat. No. 7,369,738. Other optical fiber connectors, such as SC-APC, SC-UPC, or LC, can be utilized.

The exemplary attachment system can be utilized to route a final drop in a living unit in a premise or building, such as an MDU (which for purposes of this application can include a typical MDU, multiple tenant unit (MTU), school, hotel, hospital or other location). In addition, the term "living unit" is not limited to a domicile or residence, but can include an office, conference room, hotel room, hospital room, school room or other similar room, whether or not continuously occupied. The various system components described herein are designed to provide telecommunications service within individual living units, such as residences, classrooms, or offices, within the building. The components of the system are also designed with very low impact profiles for better aesthetics within the living unit so that a drop fiber can be discreetly mounted within the open space of a living unit.

The present invention is directed to a system for adhering a continuous substrate to a mounting surface for telecommunication cabling applications that includes a segmented pressure sensitive adhesive layer. In particular, continuous communication lines can be directly adhered to walls and in corners between adjacent walls and between a wall and a ceiling to yield a more aesthetically pleasing cabling system within a premises or residence.

Figure 3:
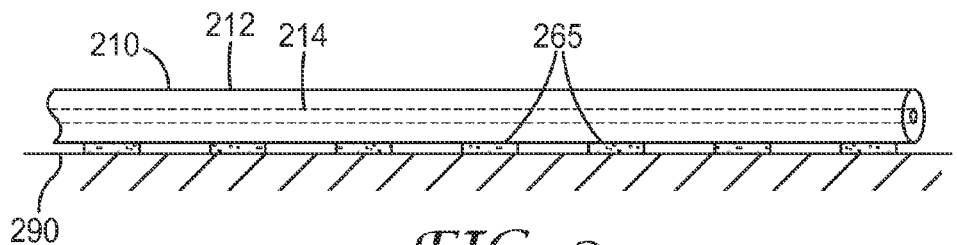
FIG. 3 is a schematic diagram of a continuous substrate attached to a mounting surface according to an aspect of the invention.

FIG. 3 shows a section of a continuous substrate 210 attached to a mounting surface 290 by a regular array of spaced apart adhesive segments 265 disposed longitudinally along the continuous substrate and between the mounting surface and the continuous substrate. In the exemplary aspect shown in FIG. 3, the continuous substrate is an optical fiber such as a 900 μm buffered optical fiber.

Figure 4:
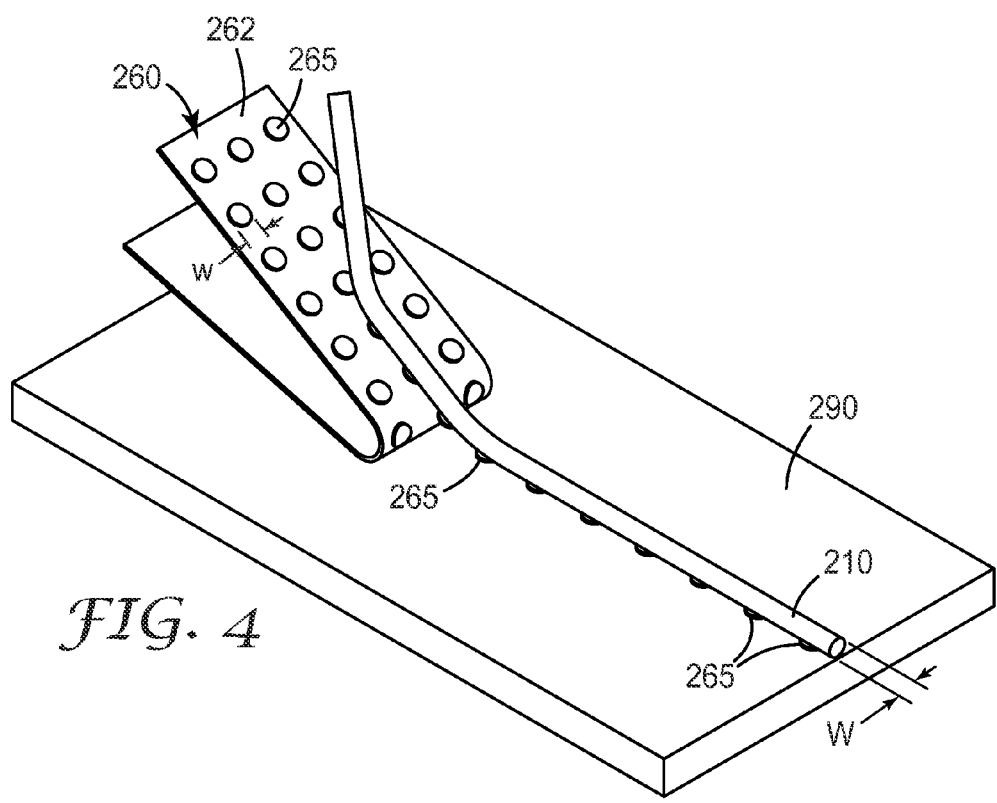
FIG. 4 is a schematic diagram illustrating the attaching of a communication line to a mounting surface according to an aspect of the invention.

The continuous substrate 210 is an elongated structure that has a length (L) of up to several tens of meters (depending on the application) along a longitudinal axis of the continuous substrate, and a substrate width, W (e.g. the width of the continuous substrate perpendicular to the longitudinal axis of the continuous substrate, FIG. 4). Thus, in a preferred aspect, the continuous substrate can have a shape or form factor (L vs. W) of at least an order of magnitude, and in many applications, a form factor of at least about 25 to 1, a form factor of at least about 50 to 1, or a form factor of at least 100 to 1.

In the exemplary aspect shown in FIG. 3, the adhesive segments have a circular profile. Alternatively, the adhesive segments can have a elliptical, rectangular or other polygonal shape. The adhesive segments are characterized by a segment width, w (FIG. 4). The segment width of the adhesive segments can be somewhat smaller than the width of the continuous substrate or can be about 75% the width of the continuous substrate or somewhat larger than the width, W, of the continuous substrate or about 125% the width of the continuous substrate. If the width of the adhesive segments is too large such that they extend beyond the margins of the continuous substrate, dust may be attracted to the adhesive, degrading the aesthetics of the substrate when it is mounted to a mounting surface. In an exemplary aspect, the segment width of the adhesive segments can be similar to the width of the continuous substrate. In the event that the segment width of the adhesive is larger than the width of the continuous substrate or the edge of the adhesive segment is exposed, the exposed portion of the adhesive segment can be coated with a thin layer of talc, glass bubbles or other similar material to eliminate any surface tack of the adhesive segments.

Figure 7:
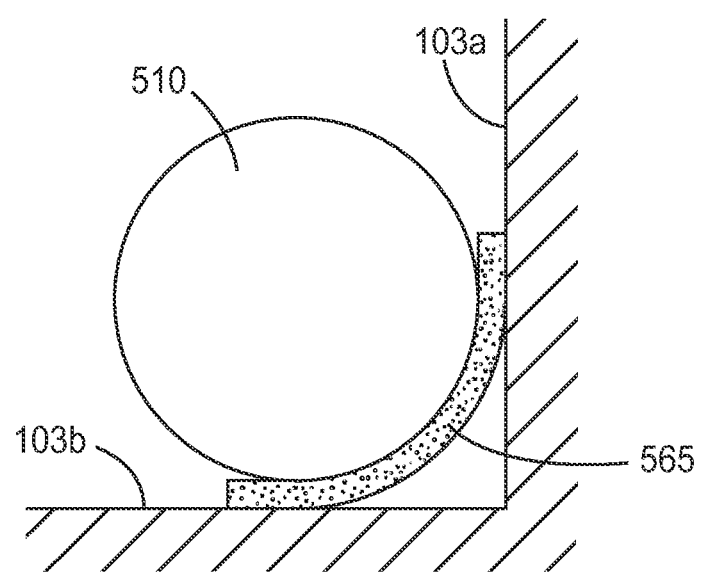
FIG. 7 is a cross-sectional view of a continuous substrate mounted in a corner between two adjacent mounting surfaces according to an aspect of the invention

When the continuous substrate is going to be mounted in a corner between two abutting mounting surfaces, it can be desirable to increase the width of the adhesive segments 565 up to about 200% of the substrate width so that the adhesive segment can wrap a portion of the perimeter of the continuous substrate 510, thus allowing it to adhere to both mounting surfaces (i.e. walls 103a, 103b) as shown in FIG. 7.

In an alternative aspect, when a wider continuous substrate is used, such as an eight fiber ribbon cable, the width of the adhesive segments can be substantially less than the width of the continuous substrate such that more than one adhesive segment is disposed along the transverse axis of the continuous substrate.

Figure 5:
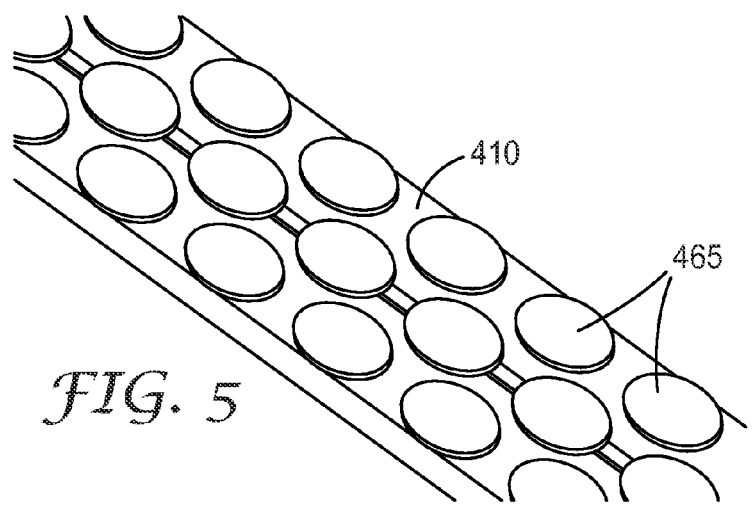
FIG. 5 is an isometric view of a portion of a continuous substrate having a segmented adhesive disposed on a mounting surface according to an aspect of the invention.

The regular array of adhesive segments on the continuous substrate can be a one dimensional array as shown in FIG. 4 or a two dimensional array as shown in FIG. 5. Specifically, FIG. 5 shows a portion of a continuous substrate 410 (e.g. an FRP drop cable) having a two dimensional regular array of elliptical adhesive segments 465 disposed on a first primary surface of the continuous substrate.

The adhesive used for the adhesive segments can be selected such that it is compatible with both the surface of the continuous substrate as well as the mounting surface. The adhesive segments can be, for example, an acrylic pressure sensitive adhesive, a polyurethane pressure sensitive adhesive, a silicone pressure sensitive adhesive or a blended pressure sensitive adhesive. The adhesive segments can have a thickness of about 0.125 mm to about 1.25 mm. Thinner adhesive segments can be used with smooth mounting surfaces and a thicker more compliant adhesive segment can be used for rough mounting surfaces. In an exemplary aspect, 0.50 mm thick adhesive segments (of a 4905F VHP transfer adhesive available from 3M Company, St. Paul, Minn.) having a segment width of 1.0 mm can be used to adhere a 900 µm buffered optical fiber to a mounting surface.

FIG. 4 illustrates one method for applying a continuous substrate 210 to mounting surface 290. The continuous substrate is brought into contact with a transfer tape 260 having an array of adhesive segments 265 disposed on a first major surface of a differential release liner 262. A portion of the adhesive segments are transferred to the continuous substrate 210 when the liner is pulled away from the continuous substrate. The continuous substrate is then applied to the mounting surface 290 using a moderate pressing force such that the adhesive segments are disposed between the continuous substrate and the mounting surface. The moderate pressing force helps ensure good adhesion of the continuous substrate to the mounting surface.

The method described above can be utilized in the field to apply a continuous length of a substrate to a mounting surface. In an alternative aspect the adhesive segments can be factory applied to the continuous substrate and protected by a release liner. The release liner can be removed in the field as the continuous substrate is adhered to the mounting surface.

In one aspect, the adhesive segments can be arranged in a rectangular array on the release liner, while in another aspect the adhesive segments can be arranged in a hexagonal array. The pitch of the adhesive segments determines the period or spacing of the anchor point between the continuous substrate and the mounting surface.

Figure 6A:
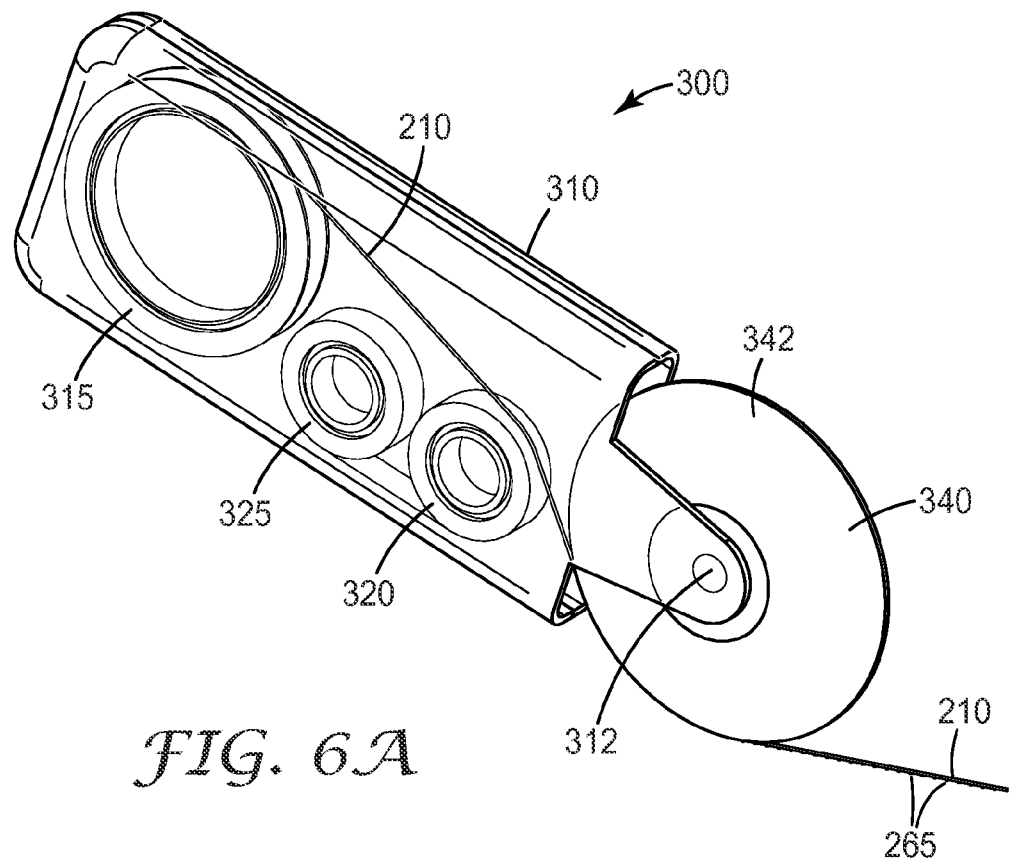
FIGS. 6A and 6B are different views of a duct applicator tool according to an aspect of the invention.
Figure 6B:
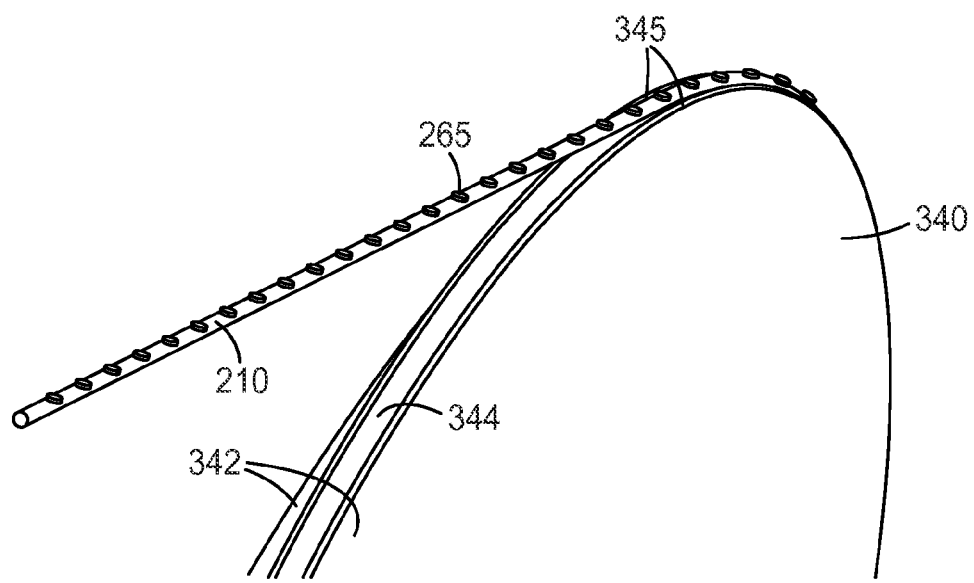

An exemplary application tool is shown in FIGS. 6A and 6B. The application tool 300 includes a profiled installation wheel 340 that is attached to one end of a housing 310. The installation wheel has beveled edges 342 that angle in toward a central channel 344 that extends circumferentially around the installation wheel and a hub disposed in the center of the installation wheel. The installation wheel is attached to the housing by axle 312 that passes through the hub of the wheel. The central channel is sized to accept the external profile of the continuous substrate 210 such that at least a portion of each adhesive segment 265 attached to the continuous substrate will extend above the lips 345 of the central channel 344 when the continuous substrate is positioned in the central channel. By beveling the edges of the installation wheel, the application tool can be used to lay the continuous substrate in a corner between two surfaces such as a corner between two walls in a room of a living unit or between a wall and the ceiling of a living unit. Installation wheel 340 applies the continuous media to a mounting surface with "zero" offset into corner and along straight lines.

Within housing 310, the application tool 300 can include a continuous substrate storage spool 315, a roll of transfer tape containing the adhesive segments 320 and a liner take up spool 325 as well as a drive mechanism (not shown) to ensure smooth operation of the application tool.

Figure 8:
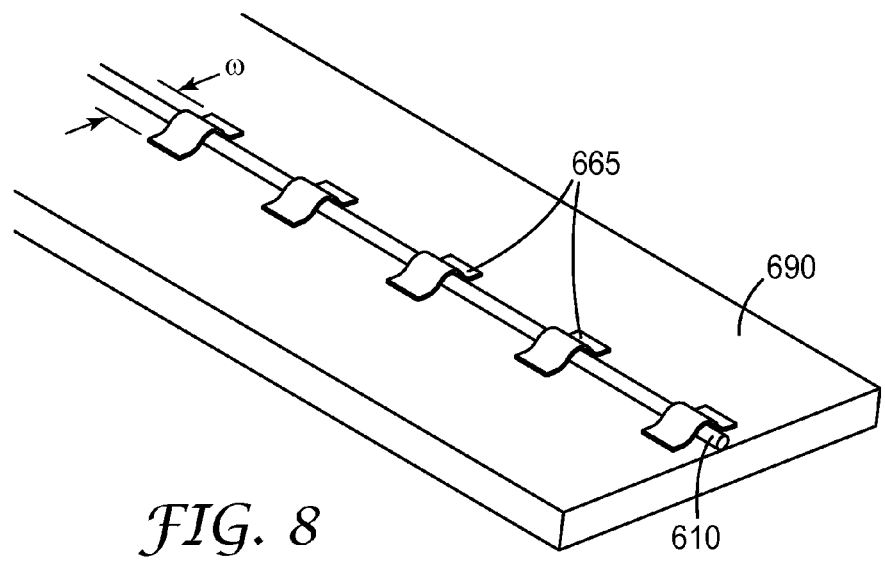
FIG. 8 is an isometric view of a portion of a continuous substrate having a segmented adhesive disposed on a mounting surface according to an aspect of the invention.

FIG. 8 shows a section of a continuous substrate 610 attached to a mounting surface 690 by a regular array of spaced apart adhesive segments 665 disposed longitudinally along the continuous substrate, such that the continuous substrate is disposed between the mounting surface and the spaced apart adhesive segments. The adhesive segments can be disposed along the continuous substrate in a one dimensional array as shown in FIG. 8. In the exemplary aspect shown in FIG. 3, the continuous substrate can be an optical fiber such as a 900 µm buffered optical fiber.

In the exemplary aspect shown in FIG. 8, the adhesive segments have a rectangular profile and comprise a thin adhesive layer and a thin non-tacky cover layer disposed on top of the adhesive layer to prevent aggregation of dust and debris settling on the surface of the adhesive. Alternatively, the adhesive segments can have a round, elliptical, square or other polygonal shape. The adhesive segments are characterized by a segment width, $\omega$ (FIG. 8). In this exemplary embodiment, the segment width of the adhesive segments can be somewhat larger than the width of the continuous substrate so that the adhesive along the edges of the adhesive segments is free to contact the mounting surface. In this embodiment, if the width of the adhesive segment is too narrow the adhesive segment will not have sufficient contact area with the mounting surface to provide a reliable attachment means for the continuous substrate.

When the continuous substrate is going to be mounted in a corner between two abutting mounting surfaces, the adhesive segment can wrap around a portion of the perimeter of the continuous substrate 610 and such that each free edge of the adhesive segment contacts one of the two abutting mounting surfaces, thus allowing the adhesive segment to adhere to both mounting surfaces.

The adhesive layer used for the adhesive segments can be selected such that it is compatible with both of the surface of the continuous substrate and the mounting surface as well as the thin non-tacky cover layer. The adhesive layer can be, for example, an acrylic pressure sensitive adhesive, a polyurethane pressure sensitive adhesive, a silicone pressure sensitive adhesive or a blended pressure sensitive adhesive. The adhesive slayer can have a thickness of about 0.125 mm to about 1.25 mm. Thinner adhesive segments can be used with smooth mounting surfaces and a thicker more compliant adhesive segment can be used for rough mounting surfaces. The cover layer can be a thin transparent film or a film that corresponds to the color and finish of the mounting surface to which it will be mounted. Alternatively, the non-tacky cover layer can be the surface of the adhesive layer that has been detackified by process such as radiation or plasma treating the surface or by dusting the surface of the adhesive with a non-tack material such as talc or glass bubbles.

Figure 9:
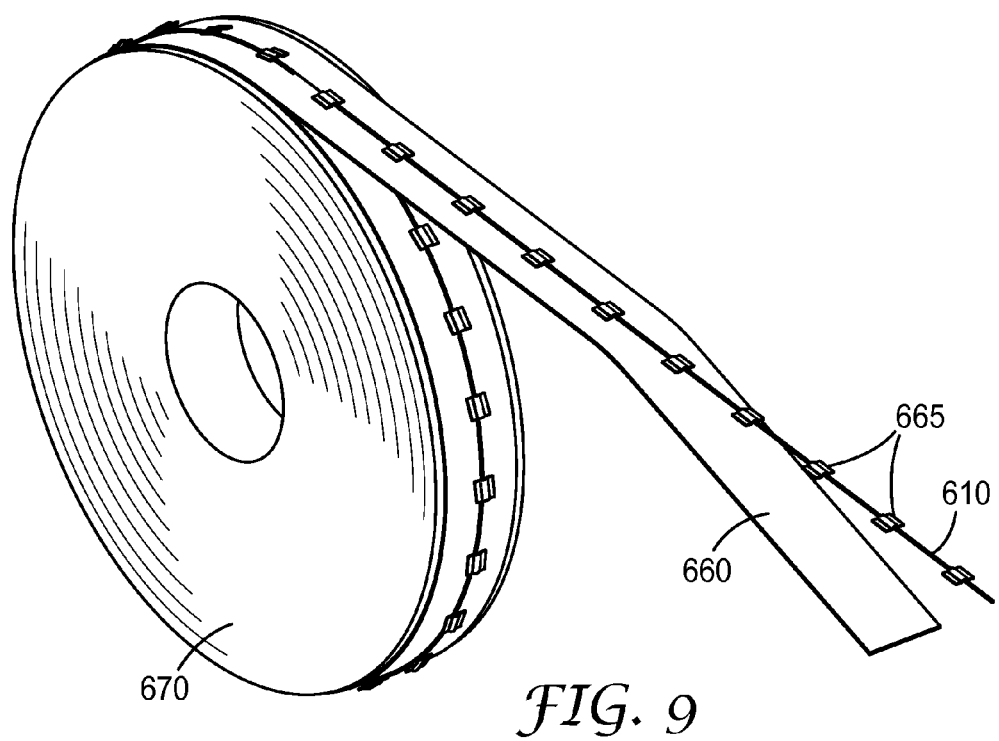
FIG. 9 is an isometric view of a continuous substrate having a segmented adhesive disposed on a storage reel according to an aspect of the invention.

FIG. 9 illustrates one method for storing and transporting the continuous substrate 610 with spaced apart adhesive segments 665 on a reel 670. The continuous substrate with spaced apart adhesive segment can be disposed on a supporting release liner 660 which can be wrapped continuously onto reel 670. To apply the continuous substrate to a mounting surface, the terminal end of the continuous substrate with spaced apart adhesive segment 665 can be separated from a supporting release liner and positioned on the mounting surface. A moderate pressing force is applied to the free edges of the adhesive segments on either side of the continuous substrates to ensure good contact (i.e. adhesion) with the mounting surface.

The method described above, the adhesive segments can be factory applied to the continuous substrate and protected by a release liner and wound up on reel 670. Alternatively, the adhesive segments can be applied over the continuous substrate in the field as it is applied to the mounting surface.

Advantageously, the storage reel delivery method of continuous substrate 610 enables a quick and simple means of applying the continuous substrate to a mounting service over significant distances (i.e. tens to hundreds of feet of continuous media can be applied continuously to a mounting surface, such as a wall or ceiling, in the case of installing communication lines in a multi-dwelling unit, hospital, office building etc. In particular, the continuous substrate is an elongated structure that has a length (L) of up to several hundreds of meters along a longitudinal axis of the continuous substrate, and a substrate width, W (e.g. the width of the continuous substrate perpendicular to the longitudinal axis of the continuous substrate, FIG. 4). Thus, in a preferred aspect, the continuous substrate can have a shape or form factor (L vs. W) of at least an order of magnitude, and in many applications, a form factor of at least about 25 to 1, a form factor of at least about 50 to 1, or a form factor of at least 100 to 1.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A storage system for a continuous substrate, the system comprising:
   a reel; and
   a continuous substrate attached to a liner by an array of discontinuous adhesive segments disposed along the length of the continuous substrate wherein, the continuous substrate disposed on the liner is wrapped around the reel, wherein the continuous substrate is a communications line.

2. The system of claim 1, wherein the adhesive segments are disposed between the liner and the continuous substrate.

3. The system of claim 1, wherein the continuous substrate is disposed between the liner and a portion of the adhesive segments.

4. The system of claim 3, wherein the adhesive segments comprise an adhesive layer and a non-tacky cover layer.

5. The system of claim 1, wherein the communications line is one of an optical fiber, a fiber optic ribbon cable, a fiber optic drop cable, an electrical wire, a coaxial cable and a micro-coaxial cable.

6. The system of claim 1, wherein the adhesive segments has one of a rectangular profile, an elliptical profile, a diamond shaped profile and a circular profile.

7. The system of claim 1, wherein the continuous substrate has a form factor (length versus width) of at least 25 to 1.

8. The system of claim 1, wherein the continuous substrate has a form factor (length versus width) of at least 50 to 1.

9. The system of claim 1, wherein the continuous substrate has a form factor (length versus width) of at least 100 to 1.

* * * * *